United States Patent
Huang

(10) Patent No.: US 9,184,849 B2
(45) Date of Patent: Nov. 10, 2015

(54) BIDIRECTIONAL SUBMARINE REPEATER USING UNIDIRECTIONAL AMPLIFICATION

(71) Applicant: NEC Laboratories America, Inc., Princeton, NJ (US)

(72) Inventor: Ming-Fang Huang, Atlanta, GA (US)

(73) Assignee: NEC Laboratories America, Inc., Princeton, NJ (US)

( * ) Notice: Subject to any disclaimer, the term of this patent is extended or adjusted under 35 U.S.C. 154(b) by 64 days.

(21) Appl. No.: 14/203,944

(22) Filed: Mar. 11, 2014

(65) Prior Publication Data

US 2014/0270782 A1 Sep. 18, 2014

Related U.S. Application Data

(60) Provisional application No. 61/777,189, filed on Mar. 12, 2013.

(51) Int. Cl.
| | |
|---|---|
| *H04B 10/25* | (2013.01) |
| *H04B 10/17* | (2006.01) |
| *H04J 14/02* | (2006.01) |
| *H04B 10/297* | (2013.01) |

(52) U.S. Cl.
CPC .................. *H04B 10/2971* (2013.01)

(58) Field of Classification Search
CPC .......... H04B 10/2971; H04B 10/2916
USPC ................................... 398/105, 62
See application file for complete search history.

(56) References Cited

U.S. PATENT DOCUMENTS

| | | | | |
|---|---|---|---|---|
| 5,452,124 A | * | 9/1995 | Baker .................. | 359/341.2 |
| 5,757,541 A | * | 5/1998 | Fidric ................ | H01S 3/06754 359/341.1 |
| 5,825,515 A | * | 10/1998 | Anderson ............ | H04B 10/035 398/10 |
| 6,160,660 A | * | 12/2000 | Aina .................. | H04B 10/2972 359/341.2 |
| 7,408,702 B2 | * | 8/2008 | Krylov ................ | H01S 3/06754 359/341.42 |
| 7,787,772 B2 | * | 8/2010 | Ota ...................... | H04J 14/0201 398/68 |
| 2001/0048799 A1 | * | 12/2001 | King .................. | H04J 14/0226 385/125 |
| 2002/0093708 A1 | * | 7/2002 | Johlen ................ | H04B 10/291 398/81 |
| 2003/0117693 A1 | * | 6/2003 | Nakamura ......... | H04B 10/2916 359/334 |

\* cited by examiner

*Primary Examiner* — Oommen Jacob
(74) *Attorney, Agent, or Firm* — Joseph Kolodka

(57) ABSTRACT

A bidirectional submarine transmission using unidirectional amplification transmits first and second communication signals bidirectional to each other over a repeater path with common end-to-end points, the repeater path includes a single unidirectional amplifier, the repeater path has a first branch path for the first communication signal through the single amplifier and a second branch path for the second communication signal through the single unidirectional amplifier, the first and second communication signals originating and leaving opposite ends of the repeater path, respectively.

12 Claims, 2 Drawing Sheets

BIDIRECTIONAL SUBMARINE REPEATER USING UNIDIRECTIONAL AMPLIFICATION

RELATED APPLICATION INFORMATION

This application claims priority to provisional application No. 61/777,189 entitled "Bidirectional Submarine Repeater Using Unidirectional Amplification technique", filed Mar. 12, 2013, the contents thereof are incorporated herein by reference.

BACKGROUND OF THE INVENTION

The present invention relates generally to optics, and more particularly, to a bidirectional submarine repeater using unidirectional amplification.

To cope with continuous network capacity demand growth, the network service providers must have a clear roadmap on increasing network capacity in next 5-10 years. In the fiber communication systems, to further boost fiber capacity using the same fiber cable deployment requires the deployed fiber to carry more capacity. Packing optical channels more tightly together in the available C-band spectrum is one approach to increase fiber capacity. Expanding the optical band could be another. Employing a single optical band can provide less than 5 THz useable bandwidth. Expanding from one band to two bands, such as C+L bands, the useable bandwidth can be increased to 8 THz or more. In Submarine transmission systems, the major cost comes from fibers and repeaters. For a 6600 km Atlantic link, the cost, including one fiber cable and repeaters, is close to 1.3 million dollars. A low cost solution for large capacity, and long distance transmission systems in submarine applications is desirable.

In order to have a large capacity transmission, packing the channels in the C and L band is one of the solutions. However, to deliver C-band and L-band signals at the same time in co-propagation will reduce the signal performance due to the Raman gain shifting. The energy from the C-band will transfer to the L-band, which will not only degrade the performance in the C-band, but it will also provide more nonlinearity in the L-band. In order to have two directional transmission (eastbound to westbound and westbound to eastbound), the solution so far has been using one link set (including one fiber cable and repeaters) for eastbound traffic and another link for westbound traffic. However, the additional fiber cable and double repeaters required double the cost to 2.6 million dollars.

Accordingly, there is a need for a bi-directional submarine transmission system that overcomes limitations of existing solutions.

BRIEF SUMMARY OF THE INVENTION

The present invention is directed to a method for bidirectional submarine transmission using unidirectional amplification including transmitting first and second communication signals bidirectional to each other over a repeater path with common end-to-end points, the repeater path including a single amplifier with unidirectional amplification, configuring the repeater path with a first branch path for the first communication signal through the unidirectional amplifier in the direction of the single amplification, and configuring the repeater path with a second branch path for the second communication signal through the single amplifier in the direction of the unidirectional amplification, the first and second communication signals originating and leaving opposite ends of the repeater path, respectively.

In an alternative expression of the invention, a bidirectional submarine transmission configuration using unidirectional amplification includes a repeater with a repeater path for transmitting first and second communication signals bidirectional to each other, the repeater path having common end-to-end points, the repeater path including a single amplifier with unidirectional amplification, a first branch path in the repeater path for the first communication signal through the single amplifier in the direction of the unidirectional amplification, and a second branch path in the repeater path for the second communication signal through the single amplifier with unidirectional amplification, the first and second communication signals originating and leaving opposite ends of the repeater path, respectively.

These and other advantages of the invention will be apparent to those of ordinary skill in the art by reference to the following detailed description and the accompanying drawings.

DETAILED DESCRIPTION

The present invention is directed to a solution to reducing Raman tilting in a bidirectional transmission system with C-band and L-band traffic at the same time. Additionally, delivering two-way communication traffic using the same fiber instated of two fibers can significantly reduce the cost. The invention entails bidirectional transmission using commercial available unidirectional amplification.

Figure 1:
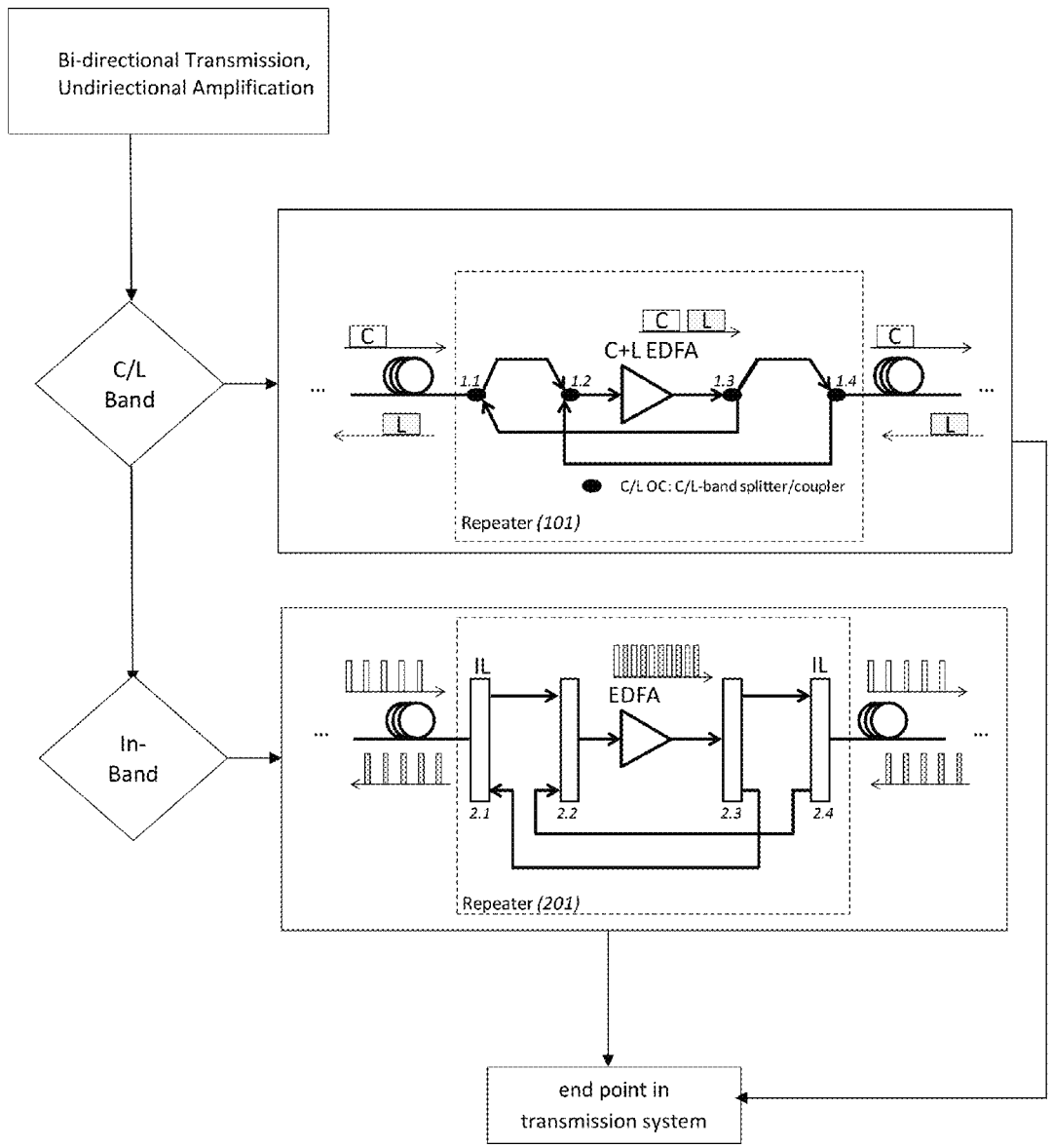
FIG. 1 is diagram of an exemplary configuration of bidirectional submarine transmission using unidirectional amplification, in accordance with the invention.

The inventive bidirectional submarine transmission, with unidirectional amplification, is shown in FIG. 1. The bidirectional transmission input is fed into a repeater module 101, 201, which in turn is coupled to an end point in the transmission system. The repeater 101, 201 employs a single amplifier, a band splitter and coupler group 1.1, 1.2, 1.3, 1.4 or a wavelength interleaving, band filter and splitter group 2.1, 2.2, 2.3, 2.4.

For bidirectional C/L-band transmission, at the repeater (101), four C/L, optical coupler OC (C/L-band splitter/coupler) (1.1-1.4) components are inserted. The right bound traffic, C-band, launches to the repeater by passing C/L OC of (1.1) to (1.2). Meanwhile, the left bound traffic, L-band, launches to the repeater via C/L OC of (1.4) to (1.2). Both right bound and left bound traffic is amplified together using a single C+L erbium-doped fiber amplifier, EDFA. After amplification, the right bound traffic, C-band, is passing through the C/L optical coupler OC of path (1.3) to (1.4) and the left bound signals, L-band, are passing through the C/L optical couple OC of path (1.4) to (1.1). In this scenario, in the fiber part, it is a bidirectional C/L-band transmission. However, in the amplification part, only one unidirectional amplifier is required. Not only is the C/L-band bidirectional transmission realized, but also in-band (same band) bidirectional transmission can be achieved. With the repeater (201) for in-band bidirectional transmission, Four interleavers (IL) are used (2.1-2.4) instead of C/L optical couplers OCs. The signals are separated into two groups, as even and odd groups. One is for left bound traffic and another one is for east bound traffic. For even groups, it follows the path of interleavers IL (2.1) to (2.2) to the EDFA to the interleavers (2.3) to (2.4). In the meanwhile, the odd groups pass the repeater from IL (2.4) to (2.2) to EDFA to IL (2.3) to (2.1). Therefore, with the invention, only a single amplifier (EDFA) in the repeater is needed to achieve bidirectional-traffic amplification.

Figure 2:
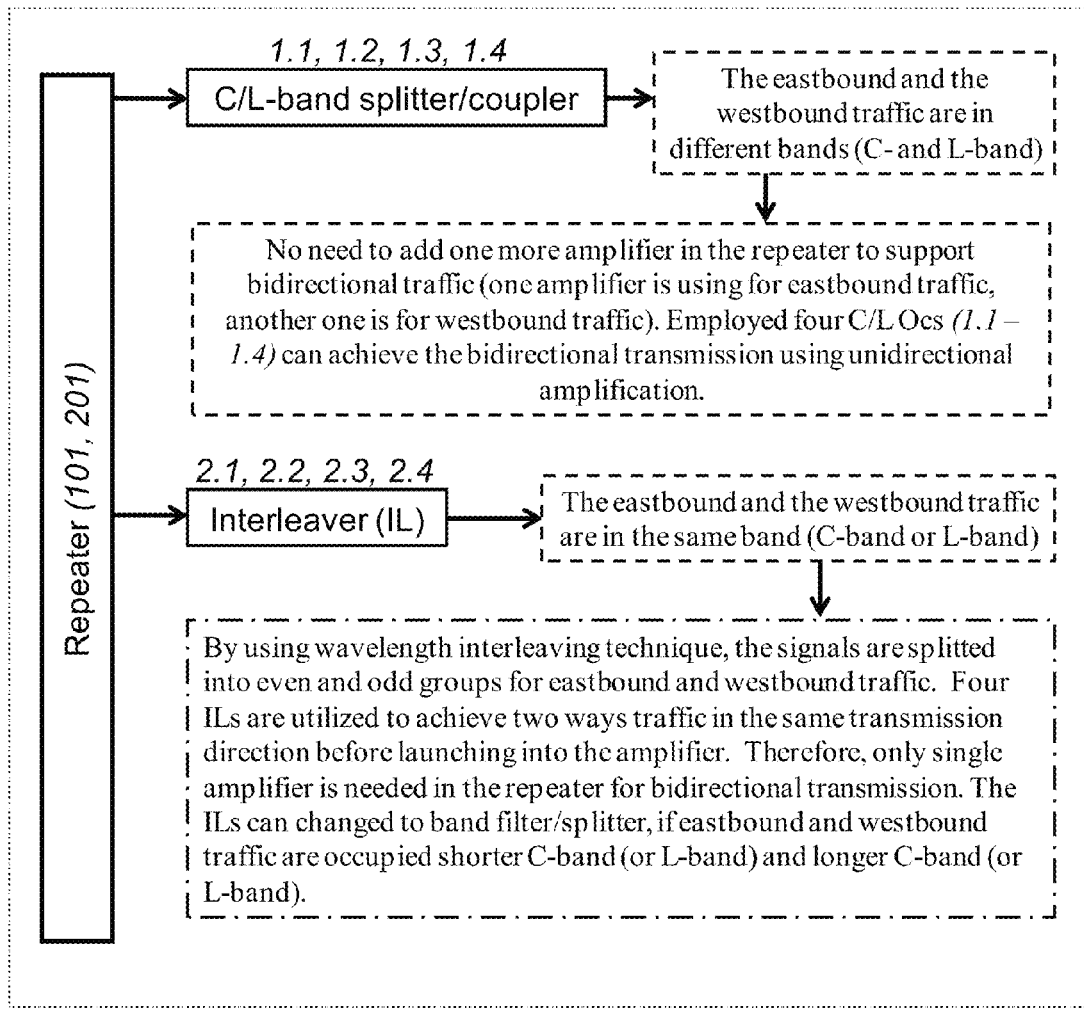
FIG. 2 is a flow diagram of key aspects of the transmission system of FIG. 1.

Turning the diagram of FIG. 2, the repeater 101, 102 accommodate C- and L-band signals or in-band signals through a splitter/coupler path, 1.1-1.4, and an interleaver path, 2.1-2.4, respectively. In the case of C- and L-band signals the eastbound and westbound traffic is in different bands. In the case of in-band signals, the eastbound and westbound traffic is in the same band, C-band or L-band. The inventive repeater path allows for no need to add one more amplifier in the repeater path to support bidirectional traffic. The repeater path can employ four C-band and L-band C/L optical couplers OCs (1.1-1.4) to achieve the bidirectional transmission using unidirectional amplification. The inventive repeater path can accommodate in-band signals by using wavelength interleaving where the signals are split into even ad odd groups for the east bound and westbound traffic. Four interleavers ILs are used to achieve two-way traffic in the same transmission direction before launching in the single amplifier. Thus, only a single amplifier is needed in the repeater for bidirectional transmission. The ILs can be changed to a band filter/splitter path, if eastbound and westbound traffic are occupied in a shorter C-band or L-band and a longer C-band or L-band.

From the foregoing, it can be appreciated that this invention provides a low cost, superior solution for bidirectional submarine transmission using unidirectional amplification. The invention uses a single amplifier in the repeater. The solution for bidirectional C/L-band traffic includes using four C/L-band splitter/couplers. The two way traffic is amplified together using one C+L amplifier. For bidirectional in-band transmission, two scenarios can be utilized (1) wavelength interleaving or (2) separated shorter and longer bands. With wavelength interleaving, when the traffic is using the wavelength of even and odd groups in the same band, the interleavers are employed in the repeater. In the case of separated shorter and longer bands, when the traffic is occupied the shorter C-band (or L-band) and longer C-band (or L-band), the band filter/splitter are used in the repeater.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A method for bidirectional submarine transmission using unidirectional amplification, comprising the steps of:
transmitting first and second communication signals bidirectional to each other over a repeater path with common end-to-end points, the repeater path including a single amplifier with unidirectional amplification;
configuring the repeater path with a first branch path for the first communication signal through the unidirectional amplifier in the direction of the single amplification; and
configuring the repeater path with a second branch path for the second communication signal through the single amplifier in the direction of the unidirectional amplification, the first and second communication signals originating and leaving opposite ends of the repeater path, respectively;
providing bidirectional transmission using unidirectional amplification with four C- band and L-band (C/L) optical couplers; and
processing in-band signals by using wavelength interleaving where the signals are split into even and odd traffic groups.

2. The method of claim 1, wherein the first branch path comprises an input for receiving the first communication signal from one end of the repeater path and coupled to an input to the single amplifier and the output of the unidirectional amplifier coupled to an opposite end of the repeater path.

3. The method of claim 1, wherein the second branch path comprises an input for receiving the second communication signal from an end of the repeater path opposite to the end of the repeater path that receives the first communication signal and coupled to an input of the single amplifier, the first communication signal being received at the same input when said second communication signal is not being received at the input, and the output of the single amplifier being directed to the end of the repeater path that serves as an input for the first communication signal.

4. The method of claim 1, wherein the first branch path comprises from a first end of the repeater path an input and output through the single amplifier to an opposing second end path of the repeater path, and the second branch path comprises first and second loops from the second path end of the repeater path to the first path end of the repeater path, the first loop directing the second communication signal through the single amplifier and the second loop for directing the second communication signal after the unidirectional amplification to the first end path of the repeater path.

5. The method of claim 1, wherein the first and second branch paths comprise optical couplers and splitters for providing the first and second branch paths.

6. The method of claim 1, wherein the first and second branch paths comprise interleavers for providing the first and second and second branch paths.

7. A bidirectional submarine transmission configuration using unidirectional amplification, comprising:
a repeater with a repeater path for transmitting first and second communication signals bidirectional to each other, the repeater path having common end-to-end points, the repeater path including a single amplifier with unidirectional amplification and providing bidirectional transmission using unidirectional amplification with four C- band and L-band (C/L) optical couplers;
a first branch path in the repeater path for the first communication signal through the single amplifier in the direction of the unidirectional amplification; and
a second branch path in the repeater path for the second communication signal through the single amplifier with unidirectional amplification, the first and second communication signals originating and leaving opposite ends of the repeater path, respectively; wherein in-band signals are handled using wavelength interleaving where the signals are split into even and odd traffic groups.

8. The transmission configuration of claim 7, wherein the first branch path comprises an input for receiving the first communication signal from one end of the repeater path and coupled to an input to the unidirectional amplifier and the output of the unidirectional amplifier coupled to an opposite end of the repeater path.

9. The transmission configuration of claim 7, wherein the second branch path comprises an input for receiving the second communication signal from an end of the repeater path opposite to the end of the repeater path that receives the first communication signal and coupled to an input of the unidirectional amplifier, the first communication signal being received at the same input when said second communication signal is not being received at the input, and the output of the unidirectional amplifier being directed to the end of the repeater path that serves as an input for the first communication signal.

10. The transmission configuration of claim 7, wherein the first branch path comprises from a first end of the repeater path an input and output through the unidirectional amplifier to an opposing second end path of the repeater path, and the second branch path comprises first and second loops from the second path end of the repeater path to the first path end of the repeater path, the first loop directing the second communication signal through the unidirectional amplifier and the second loop for directing the second communication signal after the unidirectional amplification to the first end path of the repeater path.

11. The transmission configuration of claim 7, wherein the first and second branch paths comprise optical couplers and splitters for providing the first and second branch paths.

12. The transmission configuration of claim 7, wherein the first and second branch paths comprise interleavers for providing the first and second and second branch paths.

* * * * *